(12) United States Patent
Snelson

(10) Patent No.: US 6,757,929 B1
(45) Date of Patent: Jul. 6, 2004

(54) PIPE CLEANING TOOL

(76) Inventor: Gary L. Snelson, 2501 Engleman Oaks La. P.O. Box #1323, Alpine, CA (US) 91901

( * ) Notice: Subject to any disclaimer, the term of this patent is extended or adjusted under 35 U.S.C. 154(b) by 0 days.

(21) Appl. No.: 10/103,929

(22) Filed: Mar. 22, 2002

(51) Int. Cl.⁷ ................................................. B08B 9/02
(52) U.S. Cl. ................. 15/104.05; 15/104.09; 15/104.095
(58) Field of Search ..................... 15/104.03, 104.05, 15/104.09, 104.095

(56) References Cited

U.S. PATENT DOCUMENTS

| | | | |
|---|---|---|---|
| 629,080 A | * | 7/1899 | Keenan |
| 878,145 A | * | 2/1908 | Middleton |
| 3,276,520 A | * | 10/1966 | Arnold |
| 3,290,711 A | | 12/1966 | Swanson |
| 4,862,549 A | | 9/1989 | Criswell et al. |
| 5,099,537 A | | 3/1992 | Denny |
| 5,363,530 A | | 11/1994 | Dunn et al. |
| 5,566,416 A | | 10/1996 | Karls |
| 5,819,353 A | * | 10/1998 | Arnell |
| D403,473 S | | 12/1998 | Hoppe |

* cited by examiner

Primary Examiner—Randall Chin

(57) ABSTRACT

A tool for cleaning pipe ends. The tool includes a de-burring assembly for de-burring pipe ends with different inside diameters. The de-burring assembly includes a plurality of frustuconical bit members, each having a different outside diameter. Each of the bit members has blade portions for engaging inner and bottom edges of the pipe ends. An elongate support structure supports the members of the de-burring assembly, while a securing member secures the de-burring assembly to the support structure. The assembly is then positionable in a drill to rotate the de-burring assembly. Each bit member is designed for a specific diameter pipe, and is replaceable if the blade portions become dull.

19 Claims, 2 Drawing Sheets

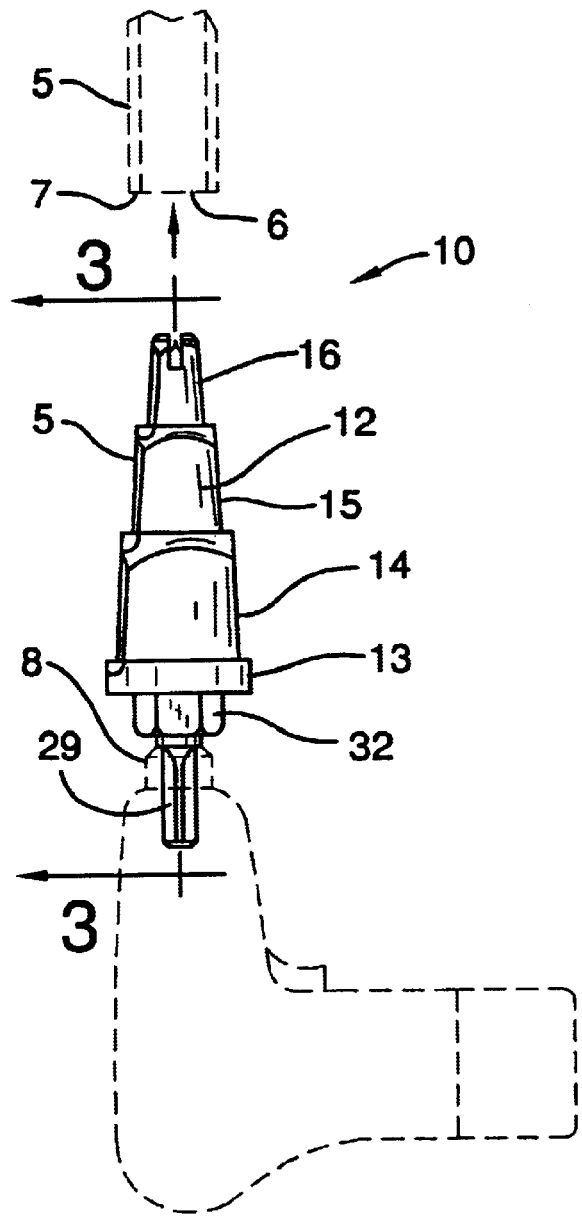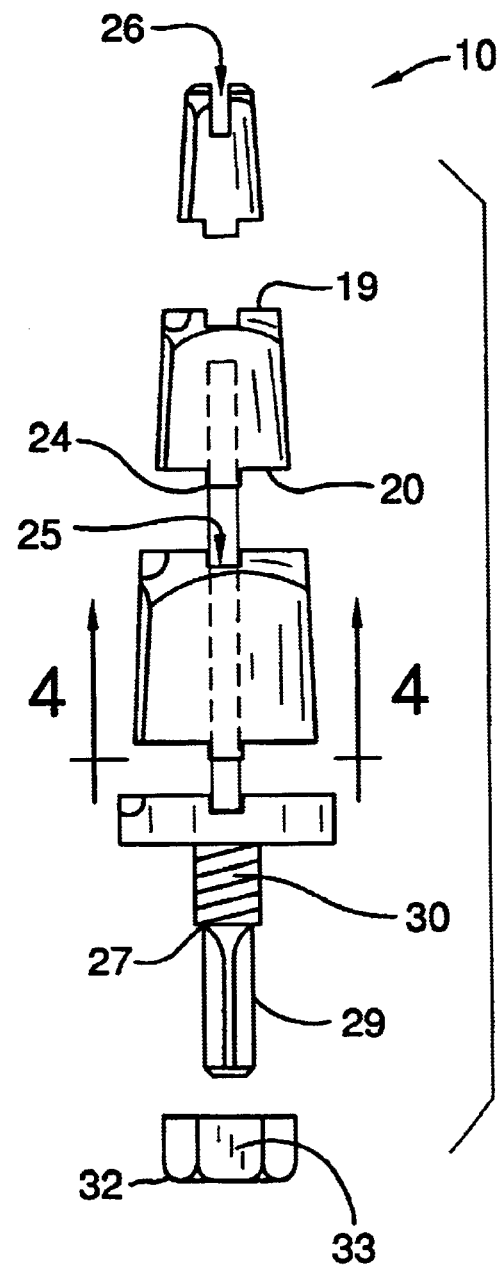
FIG.1
FIG.2

PIPE CLEANING TOOL

BACKGROUND OF THE INVENTION

1. Field of the Invention

The present invention relates to tools and more particularly pertains to a new tool for cleaning pipe ends.

2. Description of the Prior Art

The use of tools is known in the prior art. U.S. Pat. No. 3,290,711 describes a portable hand tool for cleaning pipe joints. Another type of tool is U.S. Pat. No. 5,099,537 is a combination cleaner and reamer for tubes and fittings.

While these devices fulfill their respective, particular objectives and requirements, the need remains for a single device that is capable of de-burring the ends of freshly cut conduits of several of the most common diameters, along with the capability of having interchangeable cutting sections.

SUMMARY OF THE INVENTION

The present invention meets the needs presented above by the utilization of a multi-section cutting assembly with different diameters.

An object of the present invention is to provide a new tool that speeds up the construction process in a variety of fields.

Another object of the present invention is to provide a new tool that is versatile in both use and maintenance.

To this end, the present invention generally comprises a de-burring assembly for de-burring pipe ends with different inside diameters. The de-burring assembly includes a plurality of frustuconical bit members, each having a different outside diameter. Each of the bit members has blade portions for engaging inner and bottom edges of the pipe ends. An elongate support structure supports the members of the de-burring assembly, while a securing member secures the de-burring assembly to the support structure. The assembly is then positionable in a drill to rotate the de-burring assembly. Each bit member is designed for a specific diameter pipe, and is replaceable if the blade portions become dull.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new tool according to the present invention.

FIG. 2 is a schematic exploded side view of the present invention.

DESCRIPTION OF THE PREFERRED EMBODIMENT

Figure 3:
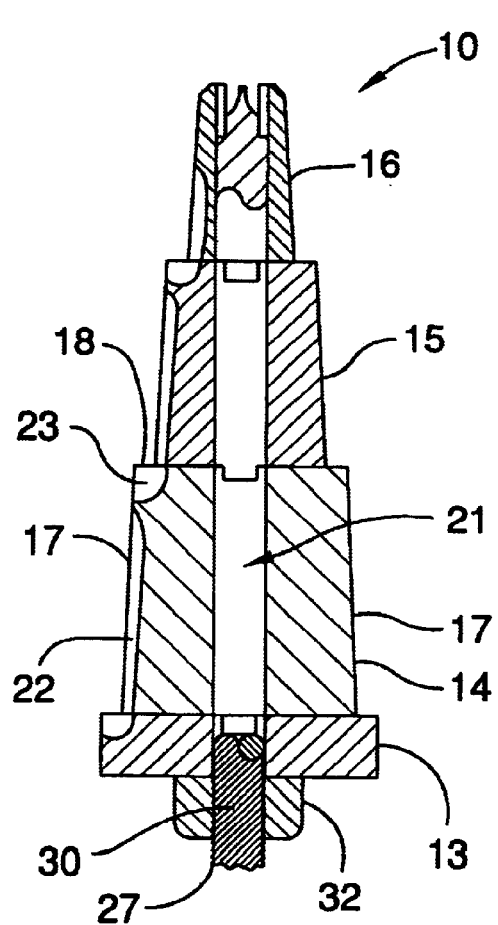
FIG. 3 is a schematic cross-sectional view of the present invention.
Figure 5:
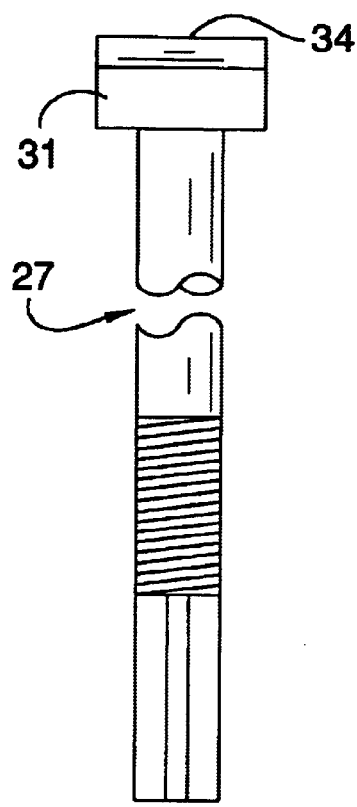
FIG. 5 is a schematic first side view of the support structure of the present invention.
Figure 6:
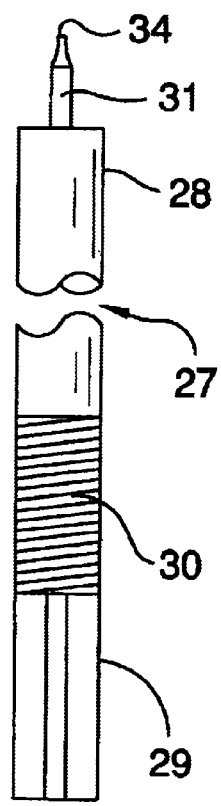
FIG. 6 is a schematic second side view of the support structure of the present invention.
Figure 4:
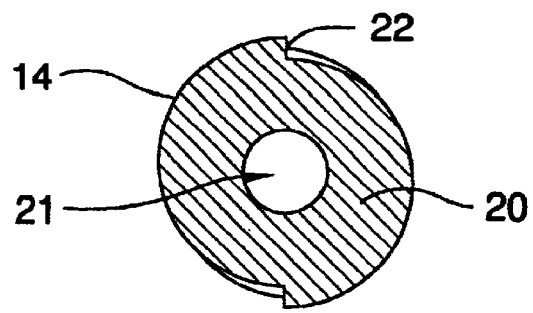
FIG. 4 is a schematic cross-sectional view of a bit member of the present invention.

With reference now to the drawings, and in particular to FIGS. 1 through 6 thereof, a new tool embodying the principles and concepts of the present invention and generally designated by the reference numeral 10 will be described.

As best illustrated in FIGS. 1 through 6, the tool 10 generally comprises a de-burring assembly 12 for de-burring pipe ends 5 with different inside diameters. The de-burring assembly 12 includes an inner bit member 14, an outer bit member 16, at least one intermediate bit member 15, and a base member 13. Each of the bit members 14, 15, 16 is substantially frustuconical.

Each of the de-burring members 13, 14, 15, 16 has a leading end 19 and a trailing end 20, and a bore 21 that extends between the leading and trailing ends 19, 20. The bores 21 are centrally positioned in each of the de-burring members 13, 14, 15, 16 such that each of the bores 21 shares a common central axis when the de-burring assembly 12 is assembled.

A diameter of the de-burring assembly 12 incrementally decreases from the trailing end 20 of the base member 13 to the leading end 19 of the outer bit member 16 progressively such that the de-burring assembly 12 is sectioned thereby being insertable into pipe ends 5 with different inside diameters.

Each of the bit members 14, 15, 16 has a pair of first blade portions 22 for engaging inner edges 6 of the pipe ends 5. The first blade portions 22 are formed on opposite sides 17 of each of the bit members 14, 15, 16 along a length of each of the sides.

The inner bit member 14, the intermediate bit member 15 and the base member 13 each have a pair of second blade portions 23 for engaging bottom edge 7 of the pipe ends 5. The second blade portions 23 are formed on opposite outer edges 18 of the base member 13, the inner bit member 14, and the intermediate bit member 15.

Each of the first blade portions 22 and the second blade portions 23 are alignable when each of the bit members 14, 15, 16 and the base member 13 when the de-burring assembly 12 is assembled such that the inner edges 6 and bottom edges 7 of the pipe ends 5 are engagable simultaneously.

Each of the bit members 14, 15, 16 has a pair of holding portions 24 positioned on each of the trailing ends 20. The holding portions 24 are positioned on opposite sides 17 of each of the bores 21.

The base member 13, the inner bit member 14, and the intermediate bit member 15 each have a pair of channels 25 for receiving an associated pair of the holding portions 24. The channels 25 are located on opposite sides 17 of each of the bores 21.

Each of the holding portions 24 and the channels 25 are oriented on the members in a manner such that when the de-burring assembly 12 is assembled, each of the first blade portions 22 and the second blade portions 23 are aligned.

The outer bit member 16 has a slot 26 positioned in the leading end 19 that extends across a width of the leading end 19.

An elongate support structure 27 holds the de-burring assembly 12 together. The support structure 27 is positionable in the bore 21 of each of the de-burring members 13, 14, 15, 16. The support structure 27 has a first end 28 and a second end 29.

The second end 29 of the support structure 27 is positionable in a drill chuck 8 to rotate the de-burring assembly 12 when the de-burring assembly 12 is mounted on the support structure 27. The support structure 27 includes a coupling portion 30 that is positioned adjacent to the second end 29. The coupling portion 30 is threaded.

The first end 28 of the support structure 27 comprises an elongate stop portion 31 for engaging the leading end 19 of the outer bit member 16. Dimensions of the stop portion 31 are generally equal to dimensions of the slot 26 in the outer bit member 16 such that the stop portion 31 is positionable in the slot 26 when the support structure 27 is fully received by the bores 21 of each of the de-burring members 13, 14, 15, 16.

A height of the stop portion 31 is generally equal to a height of the slot 26 in the outer bit member 16. An outermost edge 34 of the stop portion 31 is designed for engaging a fastener.

A securing member 32 secures the de-burring assembly 12 on the support structure 27. The securing member 32 is threadably couplable to the coupling portion 30 of the support structure 27 such that the securing member 32 abuts the base member 13 to hold the de-burring members 13, 14, 15, 16 together on the support structure 27. The securing member 32 comprises a threaded nut 33.

In use, the outer bit member is slid onto the support structure, leading end first, until the stop portion seats in the slot. The adjacent middle bit member(s) are then slid on and rotated until the holding portions are positioned in the associated channels of the adjacent member. The inner bit member is mated with the last middle bit member, followed by the base member being mated with the inner bit member. The securing member is placed onto the support structure and threaded onto the coupling portion until all of the members are securely held together.

The user may then slide the second end of the support structure into the drill chuck of a drill, and utilize the assembly to clean the ends of freshly cut pipes.

Since the diameters of the various sections of the assembly are stepped and available in any size desired, pipes of a multitude of diameters may be worked on.

In the preferred embodiment, the assembly consists of three distinct bit members and an associated base member designed to be utilized on pipes or conduits having inside diameters of ½", ¾", and 1".

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool for cleaning pipe ends, said tool comprising:
   a de-burring assembly for de-burring pipe ends having different inside diameters, said de-burring assembly including an inner bit member, an outer bit member, at least one intermediate bit member, and a base member;
   all of said bit members having a pair of first blade portions for engaging inner edges of the pipe ends;
   said inner bit member, each of said intermediate bit members, and said base member having a pair of second blade portions for engaging bottom edges of the pipe ends;
   each of said first blade portions and said second blade portions being alignable when each of said bit members and said base member of said de-burring assembly are assembled such that the inner edges and bottom edges of the pipe ends are engagable simultaneously;
   an elongate support structure for holding said de-burring assembly together;
   said support structure having a first end and a second end, said second end of said support structure being positionable in a drill chuck to rotate said de-burring assembly when said de-burring assembly is mounted on said support structure;
   a securing member for securing said de-burring assembly on said support structure;
   each of said members of said de-burring assembly having a leading end and a trailing end and a bore extending between said leading and trailing ends; and
   each of said bit members having a pair of holding portions positioned on each of said trailing ends, said holding portions being positioned on opposite sides of each of said bores.

2. The tool as set forth in claim 1, further comprising each of said bit members being substantially frustuconical.

3. The tool as set forth in claim 1, further comprising said bores being centrally positioned in each of said members of said de-burring assembly such that each of said bores share a common central axis when said de-burring assembly is assembled.

4. The tool as set forth in claim 1, further comprising a diameter of said de-burring assembly incrementally decreasing from said trailing end to said leading end progressively from said base member to said outer bit member such that said de-burring assembly is sectioned so that a portion of said de-burring assembly is insertable into pipe ends having different inside diameters.

5. The tool as set forth in claim 1, further comprising said first blade portions being formed on opposite sides of each of said bit members along a length of each of said sides.

6. The tool as set forth in claim 1, further comprising said second blade portions being formed on opposite outer edges of said base member, said inner bit member, and said intermediate bit members.

7. The tool as set forth in claim 1, further comprising said base member, said inner bit member, and said intermediate bit members each having a pair of channels for receiving an associated pair of said holding portions, said channels being located on opposite sides of each of said bores.

8. The tool as set forth in claim 7, further comprising each of said holding portions and said channels being oriented on said members in a manner such that when said de-burring assembly is assembled each of said first blade portions and said second blade portions are aligned.

9. The tool as set forth in claim 1, further comprising said support structure being positionable in said bores of each of said members said de-burring assembly.

10. The tool as set forth in claim 1, further comprising said support structure including a coupling portion being positioned adjacent to said second end, said coupling portion being threaded.

11. The tool as set forth in claim 10, further comprising said securing member being threadably couplable to said coupling portion of said support structure such that said securing member abuts said base member to hold said members of said de-burring assembly together on said support structure, said securing member comprising a threaded nut.

12. A tool for cleaning pipe ends, said tool comprising:
a de-burring assembly for de-burring pipe ends having different inside diameters, said de-burring assembly including an inner bit member, an outer bit member, at least one intermediate bit member, and a base member;
all of said bit members having a pair of first blade portions for engaging inner edges of the pipe ends;
said inner bit member, each of said intermediate bit members, and said base member having a pair of second blade portions for engaging bottom edges of the pipe ends;
each of said first blade portions and said second blade portions being alignable when each of said bit members and said base member of said de-burring assembly are assembled such that the inner edges and bottom edges of the pipe ends are engagable simultaneously;
an elongate support structure for holding said de-burring assembly together;
said support structure having a first end and a second end, said second end of said support structure being positionable in a drill chuck to rotate said de-burring assembly when said de-burring assembly is mounted on said support structure;
a securing member for securing said de-burring assembly on said support structure;
each of said members of said de-burring assembly having a leading end and a trailing end and a bore extending between said leading and trailing ends; and
said outer bit member having a slot positioned in said leading end and extending across a width of said leading end.

13. The tool as set forth in claim 12, further comprising said first end of said support structure comprising an elongate stop portion for abutting said leading end of said outer bit member of said de-burring assembly, dimensions of said stop portion being generally equal to dimensions of said slot in said outer bit member such that said stop portion is positionable in said slot when said support structure is fully received by said bores of each of said de-burring assemblies.

14. The tool as set forth in claim 13, further comprising a height of said stop portion being generally equal to a height of said slot in said outer bit member.

15. The tool as set forth in claim 13, further comprising an outermost edge of said stop portion being adapted for engaging a fastener.

16. The tool as set forth in claim 12, further comprising each of said bit members being substantially frustuconical.

17. The tool as set forth in claim 12, further comprising said bores being centrally positioned in each of said members of said de-burring assembly such that each of said bores share a common central axis when said de-burring assembly is assembled.

18. The tool as set forth in claim 12, further comprising a diameter of said de-burring assembly incrementally decreasing from said trailing end to said leading end progressively from said base member to said outer bit member such that said de-burring assembly is sectioned so that a portion of said de-burring assembly is insertable into pipe ends having different inside diameters.

19. A tool for cleaning pipe ends, said tool comprising:
a de-burring assembly for de-burring pipe ends having different inside diameters, said de-burring assembly including an inner bit member, an outer bit member, at least one intermediate bit member, and a base member, each of said bit members being substantially frustuconical, each of said members of said de-burring assembly having a leading end and a trailing end and a bore extending between said leading and trailing ends, said bores being centrally positioned in each of said members of said de-burring assembly such that each of said bores share a common central axis when said de-burring assembly is assembled, a diameter of said de-burring assembly incrementally decreasing from said trailing end to said leading end progressively from said base member to said outer bit member such that said de-burring assembly is sectioned so that a portion of said de-burring assembly is insertable into pipe ends having different inside diameters, each of said bit members having a pair of first blade portions for engaging inner edges of the pipe ends, said first blade portions being formed on opposite sides of each of said bit members along a length of each of said sides, said inner bit member, each of said intermediate bit members, and said base member having a pair of second blade portions for engaging bottom edges of the pipe ends, said second blade portions being formed on opposite outer edges of said base member, said inner bit member, and said intermediate bit members, each of said first blade portions and said second blade portions being alignable when each of said bit members and said base member of said de-burring assembly are assembled such that the inner edges and bottom edges of the pipe ends are engagable simultaneously, each of said bit members having a pair of holding portions positioned on each of said trailing ends, said holding portions being positioned on opposite sides of each of said bores, said base member, said inner bit member, and said intermediate bit members each having a pair of channels for receiving an associated pair of said holding portions, said channels being located on opposite sides of each of said bores, each of said holding portions and said channels being oriented on said members in a manner such that when said de-burring assembly is assembled each of said first blade portions and said second blade portions are aligned, said outer bit member having a slot positioned in said leading end and extending across a width of said leading end; and
an elongate support structure for holding said de-burring assembly together, said support structure being positionable in said bores of each of said members said de-burring assembly, said support structure having a first end and a second end, said second end of said support structure being positionable in a drill chuck to rotate said de-burring assembly when said de-burring assembly is mounted on said support structure, said support structure including a coupling portion being positioned adjacent to said second end, said coupling portion being threaded, said first end of said support structure comprising an elongate stop portion for abutting said leading end of said outer bit member of said de-burring assembly, dimensions of said stop portion being generally equal to dimensions of said slot in said outer bit member such that said stop portion is positionable in said slot when said support structure is fully received by said bores of each of said de-burring assemblies, a height of said stop portion being generally equal to a height of said slot in said outer bit member, an outermost edge of said stop portion being adapted for engaging a fastener; and a securing member for securing said de-burring assembly on said support structure, said securing member being threadably couplable to said coupling portion of said support structure such that said securing member abuts said base member to hold said members of said de-burring assembly together on said support structure, said securing member comprising a threaded nut.

* * * * *